United States Patent [19]

Sobotta

[11] 3,841,749
[45] Oct. 15, 1974

[54] SLIDE PROJECTOR MAGAZINE POSITIONING MEANS

[75] Inventor: Reinhard Sobotta, Mascherode, Germany

[73] Assignee: Rollei-Werke Franke & Heidecke, Braunschweig, Germany

[22] Filed: June 1, 1973

[21] Appl. No.: 365,986

[30] Foreign Application Priority Data
June 12, 1972 Germany.................... 2228603

[52] U.S. Cl. ............................................. 353/117
[51] Int. Cl. ......................................... G03b 23/06
[58] Field of Search ....................... 353/103–117

[56] References Cited
UNITED STATES PATENTS

| | | | |
|---|---|---|---|
| 3,276,156 | 10/1966 | Robinson | 353/117 |
| 3,386,195 | 6/1968 | Pester | 40/79 |
| 3,554,639 | 1/1971 | Robinson | 353/117 |

Primary Examiner—Louis R. Prince
Assistant Examiner—A. Jason Mirabito
Attorney, Agent, or Firm—Stonebraker & Shepard

[57] ABSTRACT

A detent or latch member pivotally mounted on the slide projector engages a notch or recess in a circular slide magazine or tray, to enable the tray to be easily and quickly positioned in the proper starting position for showing the first slide, even when the room is dark and the numbers or other identifying markings on the circular magazine cannot be seen. When the slide changing mechanism is operated, the detent is automatically withdrawn from the notch in the magazine, to permit the magazine to be rotated as required for projection of successive slides. In one embodiment, motor driven mechanism is used for turning the magazine from the random position in which it is inserted into the projector, to the proper initial starting position determined by engagement of the detent in the notch, and the engagement of the detent in the notch automatically disconnects this motor drive.

4 Claims, 5 Drawing Figures

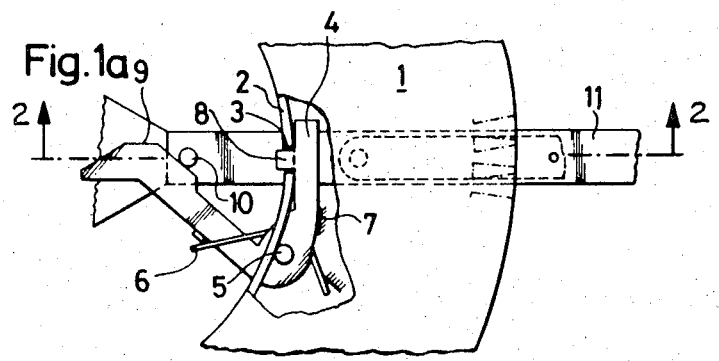
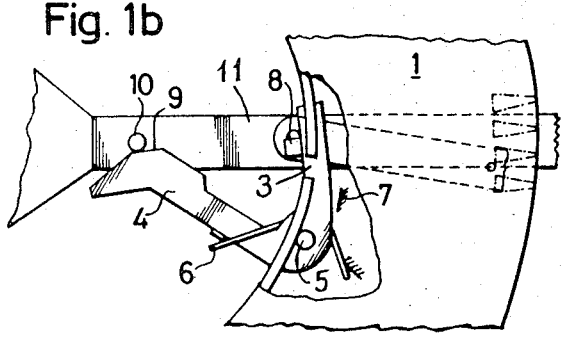
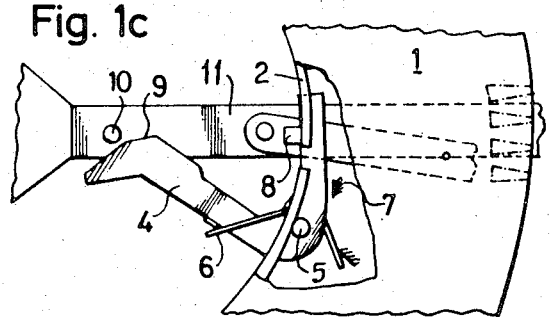
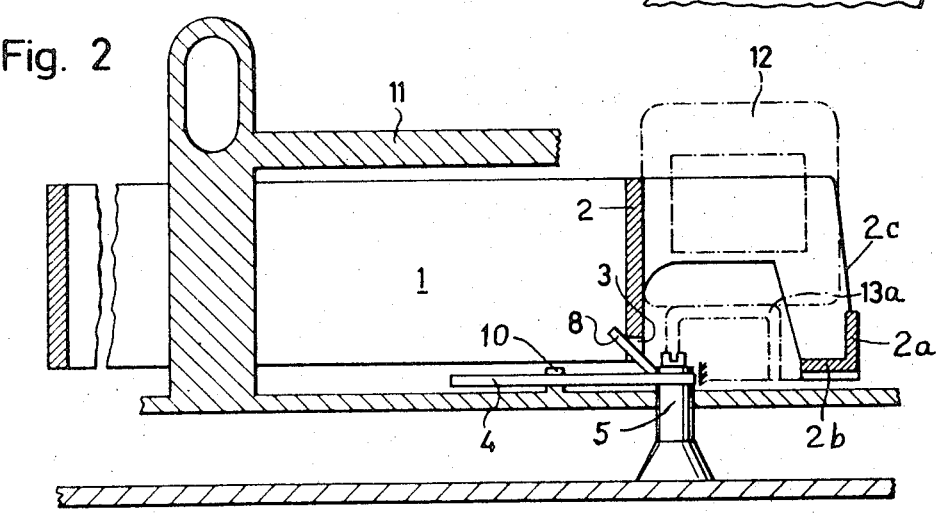

SLIDE PROJECTOR MAGAZINE POSITIONING MEANS

BACKGROUND OF THE INVENTION

Several kinds or styles of circular magazines or trays for holding picture slides are known in the art. They include magazines which, when in normal operating position on the projector, are arranged on edge, to rotate about a horizonal axis, and also magazines which are arranged flat or horizontally on the projector, to rotate about a vertical axis. Those of the latter kind (that is, those arranged horizontally on the projector) are of at least two types, in one of which the circular magazine is arranged on top of the projector and successive individual slides are moved downwardly through a slot in the bottom of the magazine to the proper projection position in the projector and then returned upwardly through the slot to rest position in the magazine, while in the other of which types the magazine is laterally offset from the optical axis of the projector at roughly the same elevation as the optical axis, and the successive slides to be projected are moved laterally approximately horizontally from their respective individual compartments in the magazine, into the projection position in the film gate or picture window of the projector, and then back again horizontally to the storage compartment when projection of that individual slide is completed. With magazines of this type, the magazine has an annular slot in its bottom (which thus is only a partial bottom, not a complete one) to accommodate a stationary ramp on the projector, which serves to raise the slides, as they approach a position in lateral alignment with the picture window, so that the bottom edge of the slide will be raised high enough to clear the low outer circular wall of the magazine, as the slide is moved laterally to the optical axis. An example of a magazine of this type, and its relation to the projector with which it is used, are disclosed in my copending patent application, Ser. No. 180,400, filed Sept. 14, 1971, (now U.S. Pat. No. 3,790,269 granted Feb. 5, 1974) to which reference is made for the benefit of those who may not already be familiar with such magazines. The copending application also discloses the ramp for raising the slides to an elevation sufficient to clear the low outer wall of the magazine, and one form of pusher mechanism or transfer mechanism for moving the raised slide laterally from the magazine to the projection position in the picture window of the projector, and then back into the magazine again when projection is completed.

The present invention is illustrated, as an example, in connection with a projector intended for magazines of the last type above mentioned, that is, magazines of the kind shown in said copending application. However, the present invention is equally useful with all of the above mentioned kinds, styles, or types of circular magazines. Those skilled in the art, after studying the present disclosure, will easily be able to adapt or modify the specifically disclosed structure of the present invention so as to accommodate other kinds, styles, or types of circular magazines.

All of these kinds of circular magazines usually accommodate about 80 or more individual picture slides, the exact number being unimportant for purposes of the present invention. Usually the individual slide compartments are numbered, or if each one is not numbered, at least there is a number 1 or other suitable starting indication in connection with the first compartment, so that in loading the magazine with slides to be shown, the user has a definite starting place. Then when the magazine is mounted on the projector, the magazine should be turned or oriented to the proper position so that this initial starting compartment "1" is opposite or laterally aligned with the projection position or picture window position of the projector, so that the showing of pictures will start with the slide which the operator intended to be the first one shown. But this matter of turning or oriented the circular magazine to the proper starting position is not as simple as it may sound. Often the compartment numbers are so small or so inconspicuous that they are hard to see. Sometimes they are impossible to see, if the room is only dimly lighted or is completely dark, ready for projection.

An object of the present invention is to provide simple, effective, and sturdy mechanism on the projector, so designed that the circular magazine may be mounted on the projector in any random position without having to look for the number or indication of the first or starting compartment of the magazine, and then may be quickly turned around to its proper starting position with ease and with certainty that the proper position has been reached.

Another object of the invention is the provision of projector mechanism of such form that it operates with a conventional circular magazine requiring only the slight change of providing a single notch in an appropriate position, for cooperation with a detent or latching member on the projector. Thus one who has a projector equipped with the mechanism of the present invention may use such projector both with new magazines initially made with the required notch, and with old magazines which the user can adapt to the new projector merely by filing or cutting a simple notch at an appropriate place in one edge of the magazine.

Still another object of the invention is the provision of projector mechanism so designed that when the detent or latching member on the projector has engaged in the notch on the magazine, to indicate that the magazine has been rotated to the correct starting position, the next operation of the slide changer mechanism will automatically withdraw the detent from the notch, freeing the magazine for the necessary step by step rotation in the conventional manner to bring successive slides around to projection position.

A further object is the provision of a projector having motor driven means for turning the circular magazine from the random position in which it may have been initially mounted in the projector, to the proper starting position with the first slide compartment aligned with the film gate or picture window, such means then automatically stopping the magazine in this proper position for transfer of the first slide to projection position, and releasing the holding detent which temporarily stops it in this initial position, so that the magazine is free for subsequent step by step rotation by the conventional stepping means to bring successive slides to proper position for projection.

BRIEF DESCRIPTION OF THE DRAWINGS

FIG. 1a is a schematic plan of one form of mechanism according to the present invention for locating the circular tray in proper position of rotational orientation for projection of the first slide, the mechanism being shown in latching position holding the magazine in position for projection of the first slide;

FIG. 1b is a similar view showing the parts in a different position, the slide changer or transfer member having released the latch from the notch in the magazine, and the magazine having turned slightly to bring the next slide compartment to the projection position laterally aligned with the picture window;

FIG. 1c is a similar view with the slide changer moved a little farther and with the detent now at rest against the inner wall of the magazine;

FIG. 2 is a schematic vertical section taken approximately on the line 2—2 of FIG. 1a.

DESCRIPTION OF THE PREFERRED EMBODIMENTS

Figure 3:
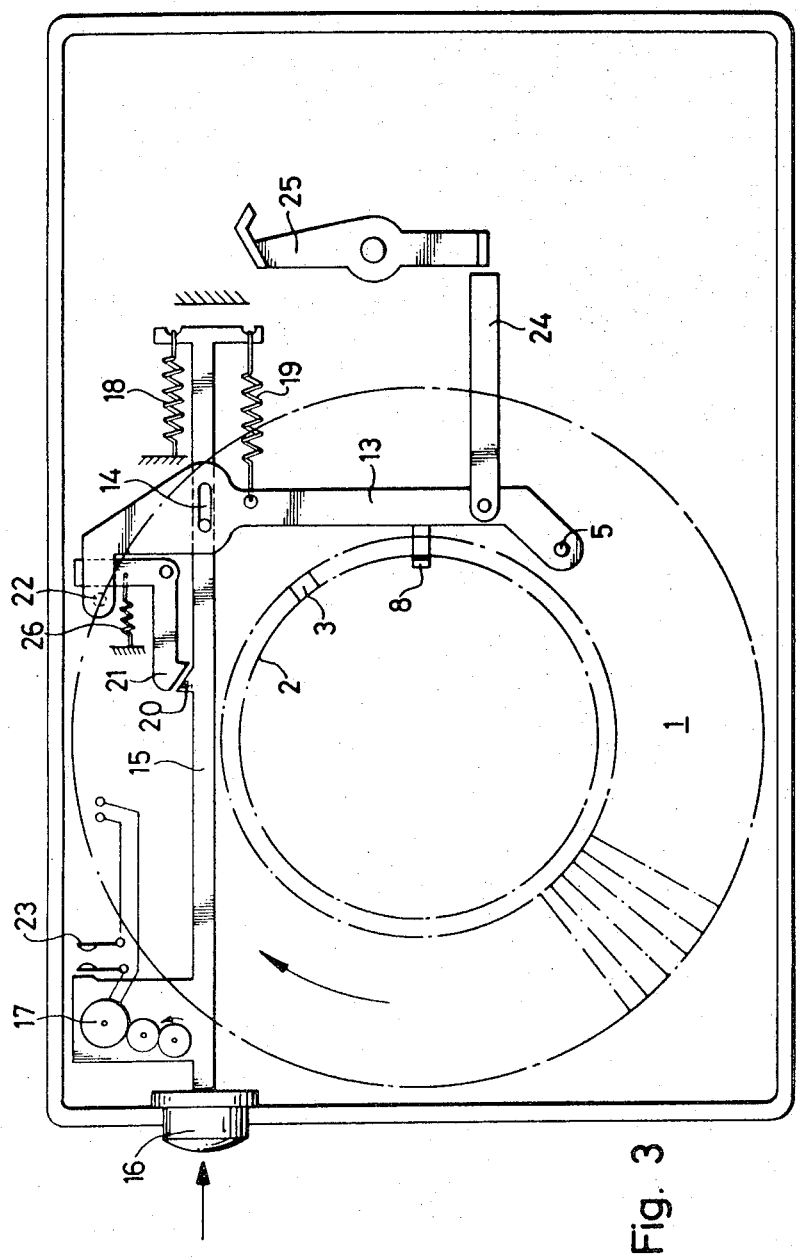
FIG. 3 is a schematic plan of a second embodiment of the invention, including motor driven means for turning the magazine from a random position to a starting or first projection position.

In the first embodiment of the invention, illustrated in FIGS. 1a, 1b, 1c, and 2, the circular magazine is partially shown at 1. As usual it has an inner circular wall 2 of cylindrical shape, an outer circular cylindrical wall 2a (FIG. 2) which is much lower than the inner circular wall 2, and an annular bottom wall 2b which extends only part way radially inwardly from the outer wall 2a toward the inner wall 2, leaving an annular slot or groove to accommodate the stationary ramp 13a of the projector. As the circular magazine rotates, successive slides approaching alignment with the projection position or picture gate of the projector are successively raised by the inclined ramp in a manner familiar in the art, until the particular slide which is aligned with the projection position of the projector is elevated enough so that its bottom edge will clear the low outer wall 2a, such position of the slide being shown in dot dash lines at 12 in FIG. 2. The individual picture slides are separated from each other by radial partitions 2c which connect the inner wall 2 to the outer wall 2a and bottom 2b. All of the just mentioned parts are conventional and well known in the art. When the slide to be projected has been sufficiently raised by the ramp and is in exactly the right position of orientation, the conventional slide changer mechanism or transfer mechanism, here indicated schematically at 11, moves the slide laterally (that is, radially outwardly with respect to the circular magazine, or to the right in FIG. 2) from the magazine to the optical axis of the projector, placing the slide in projection position in the film gate or picture window of the projector. This, too is well understood in the art.

According to the present invention, the lower edge of the inner wall 2 of the magazine is provided with a small notch or recess 3 in definite predetermined relation, in a circular or circumferential direction, to the slide compartment wherein the first or starting picture slide is to be placed. This notch 3 is initially formed in the magazine when the magazine itself is manufactured, usually by an injection molding process, from plastic material. However, if a person wishes to adapt older magazines of the same type for use with a projector according to the present invention, this can easily be done by filing or cutting the lower edge of the wall 2 at the appropriate place, to form the notch required for cooperation with the mechanism on the projector. It is preferred to have the notch in direct radial alignment with the starting compartment or number 1 compartment of the magazine, although it could be offset circumferentially in one direction or the other from the no. 1 compartment, provided the cooperating detent or latch member of the projector is correspondingly offset in one direction or the other from the position of lateral alignment with the picture window or film gate of the projector.

The projector is provided with a locking or latching lever 4, of bent shape somewhat like a bellcrank, pivoted on a stationary pivot 5. A spring 6 tends to swing the lever 4 clockwise on its pivot 5, toward a stationary stop 7 which limits its motion in a clockwise direction. An ear or lug 8, bent up from one arm of the lever 4, serves as a detent or latch to enter the notch 3 of the magazine, when this notch 3 is opposite the detent 8.

The second arm of the latching lever 4 has a cam surface 9 for cooperating with a pin 10 on the slide changer member 11. When the slide charger 11 is moved all the way radially outwardly (to the right in these drawings) the pin 10 is to the right of the highest part of the cam 9, and does not interfere with full clockwise movement of the latching lever 4. Also when the slide changer 10 is moved all the way radially inwardly (leftwardly to or beyond the position shown in FIG. 1c) the pin 10 is again beyond the high part of the cam 9, and does not interfere with full clockwise swinging of the latching lever 4. This leftward position is the position normally occupied by the slide changer when a magazine is being inserted in or removed from the projector.

In operation, the user of a projector equipped with this invention does not need to take any care in orienting the circular magazine in any particular position, when he inserts the magazine in the projector. He simply moves the magazine downwardly in the direction of its axis of rotation, into the receiving part of the projector. As the lower edge of the wall 2 of the magazine moves downwardly, it engages the detent or latching member 8, which is inclined as shown in FIG. 2, so the downward motion of the lower edge of the magazine cams the member 8 radially toward the central axis of the magazine, against the force of the light spring 6.

When the magazine has been fully seated by downward motion into the receiving socket of the projector, the magazine is turned by hand, slowly until the rotary motion is stopped by engagement of the detent member 8 in the notch 3. At this time the slide changer 11 is usually in its radially innermost position (FIG. 1c) so that the pin 10 does not interfere with clockwise movement of the detent member 8, and the detent member 8 will snap into the notch 3 of the magazine as soon as the notch is rotated to a position opposite the detent. The detent or latch member 8 is seated in the notch 3 in the position shown in FIG. 1a. The slide in the first compartment of the magazine is then in the proper position to be pushed laterally into the picture projection window of the projector, in known manner.

As the slide changer moves rightwardly, the pin 10, acting on the cam portion 9 of the latching lever 4, turns the latching lever counterclockwise to release the latching detent 8 from the notch in the magazine, but when the rightward movement is completed, the pin allows the detent to snap back into the notch again. When the projection of this particular slide has been completed and the slide changer moves leftwardly to bring the slide back from the optical axis into the proper compartment of the magazine, the pin 10 again moves the detent 8 out of the notch 3 (this position being shown in FIG. 1b) and this time, as the slide changer nears the end of its leftward movement but before the pin 10 quite releases the cam 9 of the lever 4, the usual magazine feeding mechanism of the projector (conventional and not shown) begins to turn the magazine, so that when the pin 10 does finally release the cam 9, the notch has moved a little beyond the detent 8 and the detent can no longer snap into the notch 3, but merely comes to rest against the unnotched edge of the magazine, in the position shown in FIG. 1c. Rotation of the magazine can then continue by the usual successive increments, to project successive slides, until the full rotation has been completed and the notch once more comes around to the detent position, at which time the detent snaps into the notch but projection can still be continued if repetition of the previously projected slides is desired, just as though one were starting projection. Of course normally the magazine full of slides already projected is removed from the projector, and a fresh magazine is inserted, again at random position without any attention on the part of the operator to orient the magazine in any particular way.

A second embodiment of the invention is schematically illustrated in FIG. 3, to which reference is now made. As before, the circular magazine is shown in general at 1, and has the same inner wall 2 and notch or recess 3 as previously described. The detent or latching member 8, as before, is inclined so that it will be thrust aside by the downward motion of the bottom edge of the magazine when the magazine is being mounted downwardly into the receiving space of the projector.

In this embodiment, the latching detent 8 is mounted on a lever 13 which is pivoted on the stationary pivot 5, and is connected by a pin and slot connection 14 to a push rod 15 having a manually operable push button or nob 16 projecting from the projector housing or casing to a manually accessible position.

Mounted on a lateral lug on the push rod 15, or otherwise operatively connected to the push rod to be moved thereby, is a friction wheel drive gearing schematically shown at 17, driven by a conventional electric motor (not shown) the circuit of which is controlled by a switch 23, closed when the push rod 15 is pushed to the right, and opened when the push rod moves to the left. Rightward motion of the push rod 15, by pushing the nob or button 16 against the force of a strong spring 18, not only closes the motor contact 23 but also brings one of the driving gears of the friction drive gearing 17 into engagement with the outer circular wall of the magazine, to start to turn the magazine slowly.

Another spring 19, much lighter than the spring 18, tends to move the lever 13 clockwise on its pivot 5, holding it at the extreme right position allowed by the pin and slot connection 14. When the push rod 15 is pushed to the right far enough to close the switch 23 and to bring the friction gearing 17 into contact with the magazine, a lug or dog 20 on the push rod becomes latched behind a nose on a latching lever 21, urged toward latching position by a spring 26. A pin 22 on the end of the lever 13 engages a tail on the latching member 21, when the lever 13 moves sufficiently far in a clockwise direction, and turns the latching lever 21 to release the latching engagement with the lug 20 on the push rod 15. For this purpose, the spring 19 is stronger than the latching spring 26, but weaker than the power of the spring 18 which tends to pull the rod 15 leftwardly.

Just as in the first embodiment previously described, the user of a projector according to this second embodiment simply places the magazine in the projector in any random position of circular orientation, without having to take and care, in a darkened room or otherwise, to get the first slide of the series properly aligned with the picture gate of the projector. Then the operator pushes the button 16, with enough force to overcome the spring 18, and far enough so that the lug 20 becomes latched behind the locking nose of the latching member 21. Then he can take his finger away from the button 16.

This rightward movement of the button 16 and push rod 15 to its latched position, has closed the motor contacts 23 and brought the friction drive gearing into contact with the outer circumference of the outer wall of the magazine, so that the magazine starts to rotate slowly. Assuming that the notch 3 of the magazine is not already at the location of the detent 8, the lever 13 cannot swing to the right (even though urged in that direction by the light spring 19) because the detent 18 is engaged with an unnotched part of the magazine. This, however, does not interfere with the rightward movement of the push rod 15, because the pin and slot connection 14 simply allows the pin on the rod 15 to move rightwardly in the slot, while the lever 13 is still held against rightward movement by the detent member 8.

When the rotation of the magazine, under the influence of the friction gearing 17, brings the notch 3 around to the detent 8, the following actions proceed concomitantly or approximately simultaneously: the detent 8 drops into the notch 3, thus allowing the spring 19 to swing the lever 13 rightwardly, clockwise on its privot 5. This brings the pin 22 on the lever 13 into contact with the tail of the latching lever 21, overcoming the force of the spring 26 and releasing the latching nose from the lug 20 on the rod 15. The strong spring 18 then moves the rod 15 leftwardly, at the same time opening the motor switch 23 and carrying the friction drive gearing 17 away from contact with the magazine, which now is at rest in the proper oriented position ready for projection of the first slide. The leftward movement of the rod 15, acting through the pin and slot connection 14, also moves the lever 13 leftwardly, carrying the latching detent 8 out of the notch 3, thus freeing the magazine for further rotation step by step as successive slides are projected.

Another feature of this embodiment of the invention is that the arrival of the magazine into proper position for showing the first slide, can trigger the slide changer mechanism (assuming that the slide changer is motor driven, as conventional in many projectors) so as to show the first slide. To this end, the lever 13 is provided with an extension piece 24 which, as shown, is in position to engage and turn the slide changer trigger, schematically shown at 25. When the rotation of the magazine, caused by the friction drive gearing 17, brings the magazine around to the point where the detent 8 drops into the notch 3, the consequent rightward movement of the lever 13 brings the extension 24 into engagement with the trigger 25, and slightly moves this trigger enough to initiate the operation of the slide changer to carry the first slide from the magazine to the projection position at the optical axis of the projector, this being done in known manner familiar in the art. Of course the same thing would occur if the magazine is rotated by hand rather than by the friction drive gear 17.

What is claimed is:

1. A slide projector for use with a circular slide magazine rotatable with respect to the projector to bring successive slides to a position to be transferred from the magazine to a projection position within the projector, said projector comprising means for holding a circular magazine, and movable detent means for engaging abutment means in the form of a notch on the magazine when the magazine is rotated, to determine a particular position of rotational orientation of the magazine with respect to the projector, wherein said detent means includes a movable member (13) having a portion (8) in position to drop into said notch (3) of said magazine when said notch comes opposite said portion during rotation of said magazine, a light spring (19) biasing said movable member (13) to a position wherein said portion (8) engages a surface of said magazine in which said notch (3) is located, a stronger spring (18) biased to overcome the force of said light spring (19) and to keep said portion (8) disengaged from said surface, and a manually operable member (15, 16) shiftable to a position overcoming the force of said stronger spring (18) on said light spring and thereby causing said light spring (19) to move said portion (8) into engagement with said surface of said magazine, and to enter said notch (3) upon turning of said magazine to a desired position of orientation.

2. A projector as defined in claim 1, further including latching means (20, 21) for latching said manually operable member (15, 16) in its said overcoming position, and means (22) operated by said detent means when said portion (8) thereof enters said notch, for disengaging said latching means (20, 21) to restore the overcoming effect of said stronger spring (18) with respect to said light spring (19) and thereby to remove said portion (8) from the notch which it had entered.

3. A projector as defined in claim 1, further including friction wheel gearing means (17) controlled by said manually operable member (15, 16) for rotating said magazine continuously so long as said manually operable member remains in its overcoming position.

4. A slide projector for use with a circular slide magazine rotatable with respect to the projector to bring successive slides to a position to be transferred from the magazine to a projection position within the projector, said projector comprising means for holding a circular magazine, and movable detent means for engaging abutment means in the form of a notch on the magazine when the magazine is rotated, to determine a particular position of rotational orientation of the magazine with respect to the projector, said detent means including a lever having an ear in position to drop into said notch when said notch comes opposite said ear during rotation of said magazine, a spring biased to keep said ear engaged with an edge of said magazine which has said notch at one point of said edge, and slide transfer means for transferring a slide from and to said magazine, said transfer means having a portion which, during operation of said transfer means, engages a cam portion of said lever to move said lever against the force of said spring and to withdraw said ear from said notch and from engagement with said edge of said magazine.

* * * * *